(12) United States Patent
Nagaraj et al.

(10) Patent No.: US 12,732,450 B2
(45) Date of Patent: Sep. 8, 2026

(54) DESIGNATING A PRIMARY MULTICAST FLOW AND A BACKUP MULTICAST FLOW FOR MULTICAST TRAFFIC

(71) Applicant: Juniper Networks, Inc., Sunnyvale, CA (US)

(72) Inventors: Vinod Kumar Nagaraj, Cupertino, CA (US); Vikram Nagarajan, Bangalore (IN); Zhaohui Zhang, Westford, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 521 days.

(21) Appl. No.: 17/811,670

(22) Filed: Jul. 11, 2022

(65) Prior Publication Data

US 2024/0015095 A1 Jan. 11, 2024

(51) Int. Cl.
*H04L 45/76* (2022.01)
*H04L 45/00* (2022.01)
*H04L 45/16* (2022.01)

(52) U.S. Cl.
CPC .............. *H04L 45/16* (2013.01); *H04L 45/22* (2013.01); *H04L 45/76* (2022.05)

(58) Field of Classification Search
CPC ......... H04L 45/16; H04L 45/76; H04L 45/22; H04L 12/4641; H04L 45/30; H04L 49/201; H04L 49/354
See application file for complete search history.

(56) References Cited

U.S. PATENT DOCUMENTS 9,806,895 B1 * 10/2017 Kommula ............... H04L 47/32
10,103,902 B1 * 10/2018 Sampath ................. H04L 45/16
10,855,520 B1 * 12/2020 Kommula ............... H04L 45/36
11,824,797 B1 * 11/2023 Mishra .................... H04L 61/58
2007/0268899 A1 * 11/2007 Cankaya ................. H04L 45/02 370/390
2013/0322291 A1 * 12/2013 Venkataraman ........ H04L 43/16 370/254
2016/0119156 A1 * 4/2016 Drake ................. H04L 12/4641 709/223
2018/0069908 A1 * 3/2018 Buchanan ............... H04L 65/40
2019/0036717 A1 * 1/2019 Kebler .................... H04L 45/22
2020/0259680 A1 * 8/2020 Thubert .............. H04L 49/1569

(Continued)

OTHER PUBLICATIONS

Internet Draft : Multicast Source Redundancy in EVPN Networks (Year: 2018) https://datatracker.ietf.org/doc/draft-skr-bess-evpn-redundant-mcast-source/00/.*

(Continued)

*Primary Examiner* — Hassan A Phillips
*Assistant Examiner* — Sang C Lee
(74) *Attorney, Agent, or Firm* — Harrity & Harrity, LLP

(57) ABSTRACT

A network device may receive a first redundant multicast flow indication from a first network device, and may receive a second redundant multicast flow indication from a second network device. The device may designate a primary multicast flow based on the first redundant multicast flow indication, and may designate a backup multicast flow based on the second redundant multicast flow indication. The device may accept the primary multicast flow and may discard the backup multicast flow.

20 Claims, 12 Drawing Sheets

(56) References Cited

U.S. PATENT DOCUMENTS

2020/0280455 A1* 9/2020 Mishra .................... H04L 45/16
2021/0227608 A1* 7/2021 Zhu ....................... H04W 76/40

OTHER PUBLICATIONS

J. Rabadan, Ed. et al. Multicast Source Redundancy in EVPN Networks draft-skr-bess-evpn-redundant-mcast-source-00.txt BESS Workgroup Internet Draft Oct. 22, 2018 (Year: 2018).*

Rabadan et al., "Multicast Source Redundancy in EVPN Networks draft- ietf- bess- evpn- redundant- mcast- source- 03," BESS Workgroup, Internet-Draft, Feb. 6, 2022, Website: https://www.ietf.org/archive/id/draft-ietf-bess-evpn-redundant-mcast-source-03.txt, 37 Pages.

Boutros et al., "VXLAN DCI Using EVPN," Work in Progress, Internet-Draft, Website: https://www.ietf.org/archive/id/draft-boutros-bess-vxlan-evpn-02.txt, Oct. 21, 2016, 17 Pages.

Aggarwal et al., "BGP Encodings and Procedures for Multicast in MPLS/BGP IP VPNs," Internet Engineering Task Force (IETF), Feb. 2012, 59 Pages.

Rabadan et al., "RFC 9014: Interconnect Solution for Ethernet VPN (EVPN) Overlay Networks," Internet Engineering Task Force (IETF), May 2021, 24 Pages.

Extended European Search Report for Application No. EP221924376, mailed on Sep. 14, 2023, 13 pages.

* cited by examiner

200

DESIGNATING A PRIMARY MULTICAST FLOW AND A BACKUP MULTICAST FLOW FOR MULTICAST TRAFFIC

BACKGROUND

Ethernet virtual private network (EVPN)-virtual extensible local area network (VXLAN) is a network fabric that extends layer 2 connectivity as a network overlay over an existing physical network. EVPN-VXLAN may create more agile, secure, and scalable networks for campuses and/or data centers. EVPN may be used as an overlay control plane and may provide virtual connectivity between different layer 2/3 domains over a network. VXLAN is a network virtualization overlay protocol that expands layer 2 network address space. Reverse-path forwarding (RPF) is a technique used in network devices for ensuring loop-free forwarding of multicast packets in multicast routing and to help prevent Internet protocol (IP) address spoofing in unicast routing.

SUMMARY

Some implementations described herein relate to a method. The method may include receiving a first redundant multicast flow indication from a first network device and a second redundant multicast flow indication from a second network device. The method may include designating a primary multicast flow based on the first redundant multicast flow indication, and designating a backup multicast flow based on the second redundant multicast flow indication. The method may include accepting the primary multicast flow.

Some implementations described herein relate to a network device. The network device may include one or more memories and one or more processors. The one or more processors may be configured to receive a first redundant multicast flow indication from a first network device and a second redundant multicast flow indication from a second network device. The one or more processors may be configured to designate a primary multicast flow based on the first redundant multicast flow indication, and designate a backup multicast flow based on the second redundant multicast flow indication. The one or more processors may be configured to accept the primary multicast flow.

Some implementations described herein relate to a non-transitory computer-readable medium that stores a set of instructions for a network device in a first data center. The set of instructions, when executed by one or more processors of the network device, may cause the network device to receive a first redundant multicast flow indication from a first network device that is a designated forwarder of a second data center, and receive a second redundant multicast flow indication from a second network device that is not the designated forwarder for the second data center. The set of instructions, when executed by one or more processors of the network device, may cause the network device to designate the first network device as the designated forwarder for the second data center based on the first redundant multicast flow indication, and accept first traffic from the first network device as the designated forwarder for the second data center. The set of instructions, when executed by one or more processors of the network device, may cause the network device to reject second traffic from the second network device that is not the designated forwarder for the second data center.

DETAILED DESCRIPTION

Figure 1A:
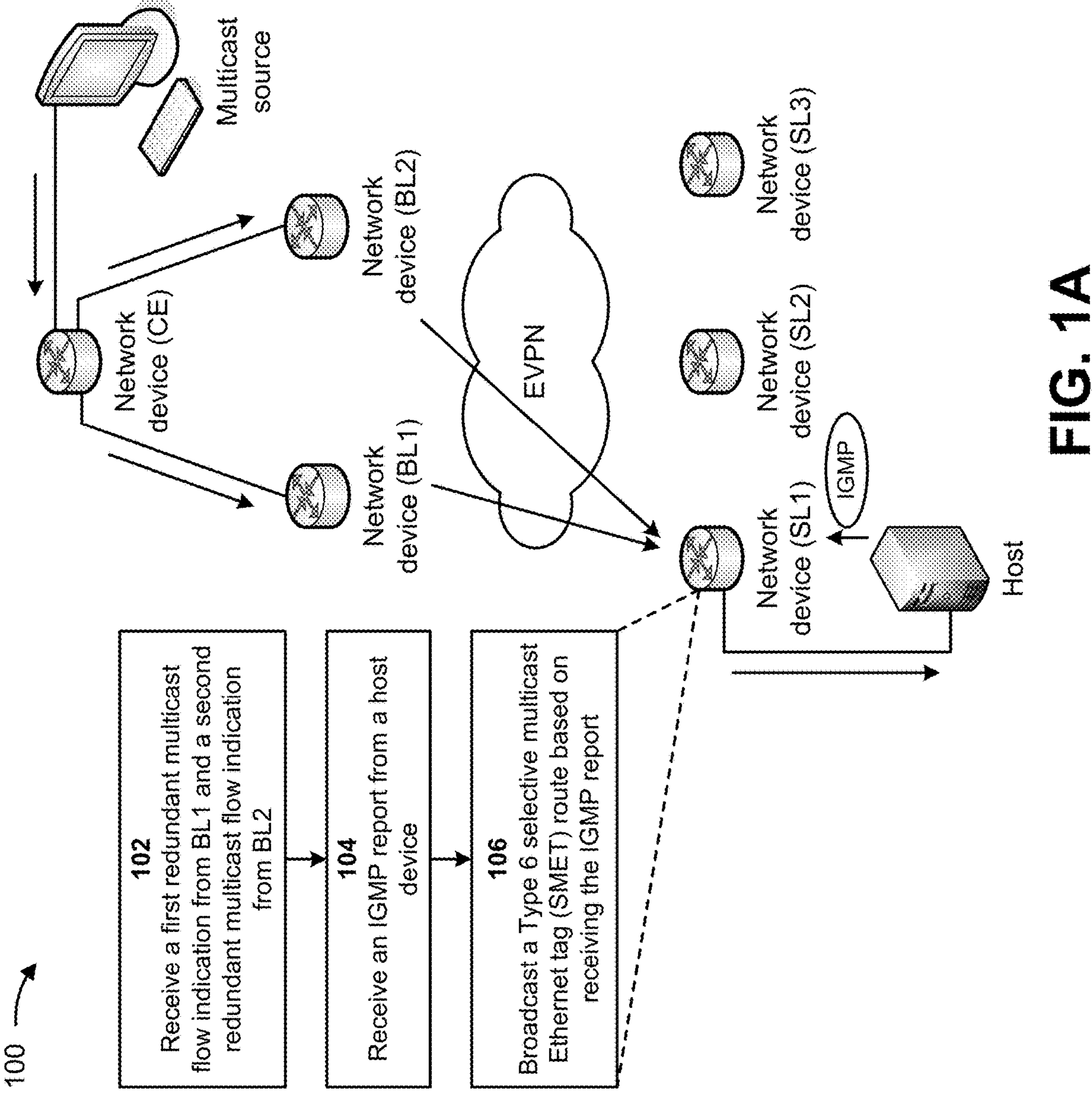
FIGS. 1A-1H are diagrams of an example associated with providing enhanced RPF for redundant EVPN-VXLAN deployments.

The following detailed description of example implementations refers to the accompanying drawings. The same reference numbers in different drawings may identify the same or similar elements.

An EVPN-VXLAN may include a customer edge network device (CE) that is connected to multicast source and is multihomed to a first border leaf network device (BL1) and a second border leaf network device (BL2). The EVPN-VXLAN may also include a first service leaf network device (SL1), a second service leaf network device (SL2), and a third service leaf network device (SL3) that are connected to a host. When the first service leaf network device receives an Internet group management protocol (IGMP) report from the host, the first service leaf network device may originate a Type 6 selective multicast Ethernet tag (SMET) route based on receiving the IGMP report. The Type 6 SMET route for a group (e.g., group G) may be imported by all EVPN devices (e.g., the first border leaf network device and the second border leaf network device may create state for group G). When the multicast source sends multicast traffic, the customer edge network device may provide the multicast traffic to either the first border leaf network device or the second border leaf network device. If the multicast traffic is provided to the first border leaf network device, the first border leaf network device may selectively forward the multicast traffic to the first service leaf network device. The first service leaf network device, in turn, may forward the multicast traffic to the host. However, failures (e.g., referred to as multicast live-live) can occur in such an arrangement. A link failure may occur in a link between the first border leaf network device and the customer edge network device, the first border leaf network device may fail, a path from the first service leaf network device to the first border leaf network device may experience congestion leading to loss of quality of the multicast flow, and/or the like.

With the multicast source multihomed to the EVPN fabric via protocol independent multicast (PIM) gateways, the first border leaf network device or the second border leaf network device may forward multicast traffic into the EVPN core. In such an arrangement, multicast traffic protection is needed for a failure in a link between the first border leaf network device and the multicast source, a failure of the first border leaf network device, congestion in a path from the first service leaf network device to the first border leaf network device, and/or the like. In the absence of multicast traffic protection, switchover to an alternate forwarder and resumption of multicast service flow may require a considerable amount of time.

In data center deployments, multicast traffic within a first data center may be forwarded by a first gateway or a second gateway to a second data center, via a wide area network (WAN). However, if the first gateway or the second gateway fail, switchover to an alternate forwarder and resumption of multicast service flow may require a considerable amount of time. Multicast traffic protection is needed for data center deployments.

Furthermore, EVPN multicast relies on layer 2 (*,G) multicast flows mainly and does not utilize an upstream interface since a layer 2 port cannot identify the RPF to a source. In EVPN, the source is provided in an emulated local area network (LAN), but provider edge network devices associated with the source are unknown. For example, for a subnet IP address of irb.2 that is 10.1.1.0/24, a source 10.1.1.5 route lookup may point only to irb.2, and a provider edge network device behind which the source is sending traffic is unknown. In EVPN, a Type 6 route may be imported by all provider edge network devices since a path and/or a location of a source is unknown.

Thus, current techniques for handling failures in EVPN-VXLAN deployments consume computing resources (e.g., processing resources, memory resources, communication resources, and/or the like), networking resources, and/or the like, are associated with delaying multicast traffic transmission through a network due to a link failure, a network device failure, and/or path congestion, losing multicast traffic due to the link failure, the network device failure, and/or the path congestion, handling lost multicast traffic caused by the link failure, the network device failure, and/or the path congestion, and/or the like.

Some implementations described herein relate to a network device that provides enhanced RPF for redundant EVPN-VXLAN deployments. For example, a network device may receive a first redundant multicast flow indication from a first border leaf network device and a second redundant multicast flow indication from a second border leaf network device, and may receive an IGMP report from a host device. The network device may identify the first redundant multicast flow indication and the second redundant multicast flow indication based on receiving the IGMP report, and may designate a primary multicast flow based on the first redundant multicast flow indication. The network device may designate a backup multicast flow based on the second redundant multicast flow indication, and may accept the primary multicast flow.

In this way, the network device provides enhanced RPF for redundant EVPN-VXLAN deployments. For example, the network device (e.g., a service leaf network device) may utilize two approaches to distinguish primary and backup multicast streams for a layer 2 group multicast flow. In a first approach, the network device may utilize VXLAN tunnel endpoint (VTEP) addresses to distinguish between the primary and backup multicast streams for a layer 2 group multicast flow. In a second approach, the network device may utilize a primary VXLAN network identifier (VNI) and a backup VNI to distinguish between the primary and backup multicast streams for a layer 2 group multicast flow. The network device may receive two copies of multicast traffic (e.g., a first copy from the first border leaf network device and a second copy from the second border leaf network device). The network device may select one copy of the multicast traffic, may forward selected copy to the host, and may drop the other copy. For example, the network device may select the multicast traffic received from the first border leaf network device and may drop the multicast traffic received from the second border leaf network device. The network device may monitor a rate of the multicast traffic received from the first border leaf network device. If the rate fails to satisfy a threshold, the network device may switch to receiving the multicast traffic from the second border leaf network device. Thus, the network device conserves computing resources, networking resources, and/or the like that would otherwise have been consumed by delaying multicast traffic transmission through a network due to a link failure, a network device failure, and/or path congestion, losing multicast traffic due to the link failure, the network device failure, and/or the path congestion, handling lost multicast traffic caused by the link failure, the network device failure, and/or the path congestion, and/or the like.

FIGS. 1A-1H are diagrams of an example 100 associated with providing enhanced RPF for redundant EVPN-VXLAN deployments. As shown in FIGS. 1A-1H, example 100 includes a multicast source, a network of network devices, and a host. Further details of the multicast source, the network, the network devices, and the host are provided elsewhere herein.

Figure 1B:
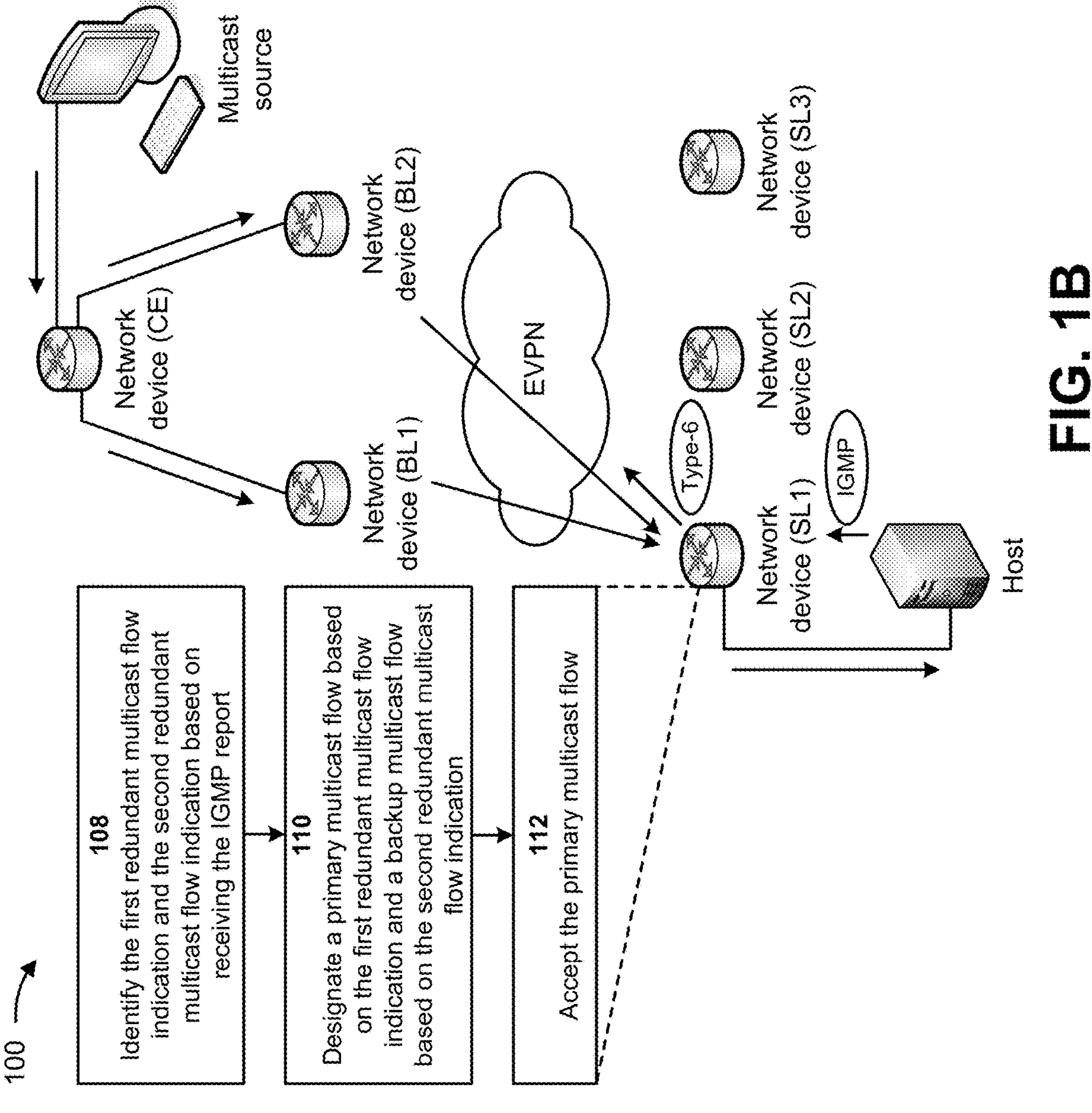
Figure 1C:
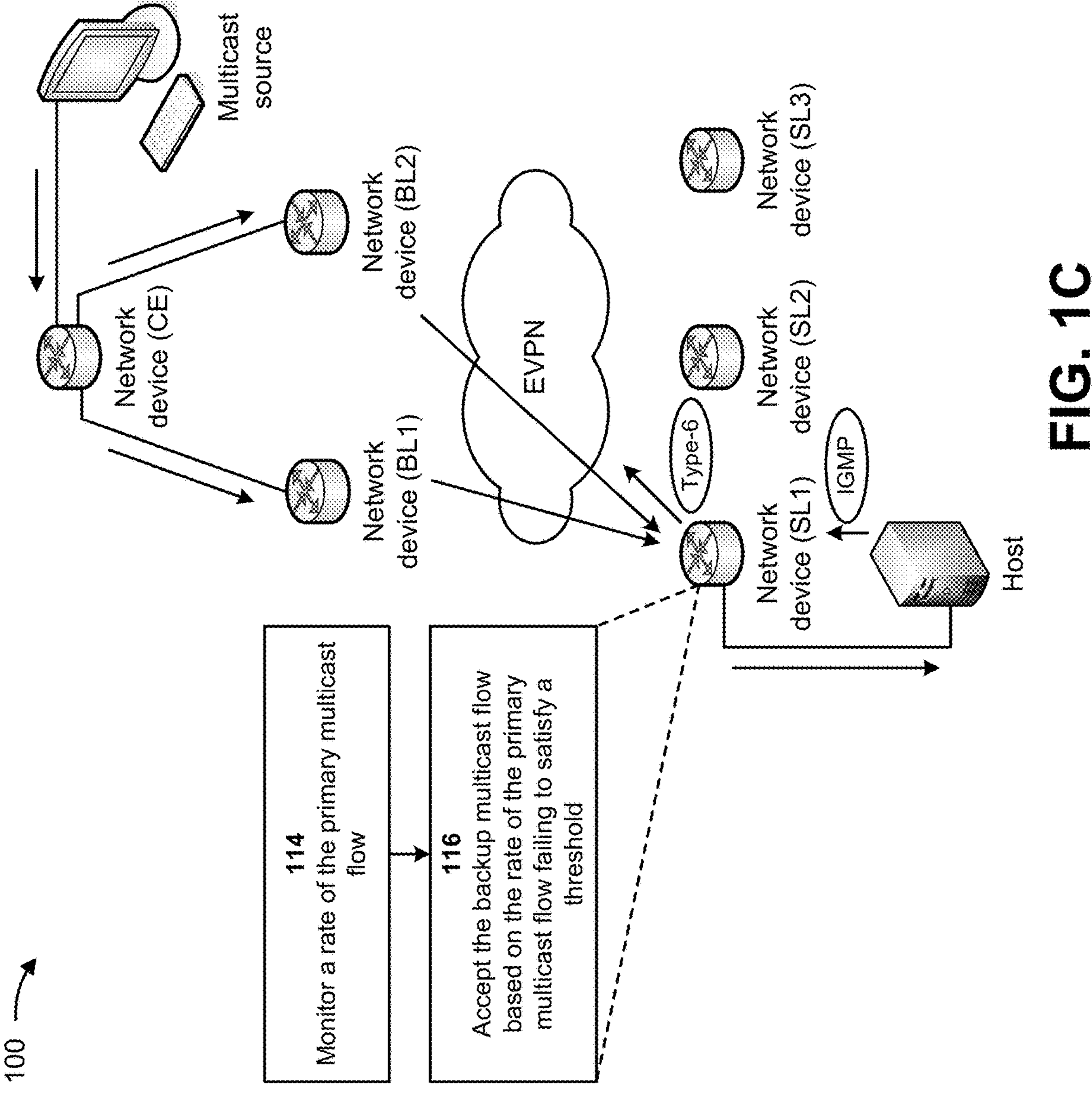

FIGS. 1A-1C may depict an EVPN data center fabric deployment. As shown, the network devices may include a first service leaf network device (SL1), a second service leaf network device (SL2), a third service leaf network device (SL3) connected to the host. The network devices may include a first border leaf network device (BL1) and a second border leaf network device (BL2) connected to the multicast source via a customer edge network device (CE). A link between the customer edge network device and the multicast source, a link between the customer edge network device and the first border leaf network device, and a link between the customer edge network device and the second border leaf network device may be associated with the same VXLAN. The first border leaf network device and the second border leaf network device may be configured with an Ethernet segment identifier (ESI). The first border leaf network device and the second border leaf network device may connect with the first service leaf network device, the second service leaf network device, and the third service leaf network device via the EVPN.

As shown in FIG. 1A, and by reference number 102, the first service leaf network device may receive a first redundant multicast flow indication from the first border leaf network device (BL1) and a second redundant multicast flow indication from the second border leaf network device (BL2). For example, the first border leaf network device may originate the first redundant multicast flow indication, and the second border leaf network device may originate the second redundant multicast flow indication. In some implementations, each of the first redundant multicast flow indication and the second redundant multicast flow indication may include a Type 10 selective-provider multicast service interface (S-PMSI) route identifier for a single flow group (SFG) (e.g., group G). In some implementations, the first redundant multicast flow indication may include the syntax 10: BL1-RD: Ethernet Tag: Source: Group: Originator-IP (BL1-SVTEP-IP): VNI (e.g., where VNI corresponds to VXLAN network identifier), and the second redundant multicast flow indication may include the syntax 10: BL2-RD: Ethernet Tag: Source: Group: Originator-IP (BL2-SVTEP-IP): VNI. Alternatively, the first redundant multicast flow indication may include the syntax 10: BL1-RD: Ethernet Tag: Source: Group: VNI=6000, and the second redundant multicast flow indication may include the syntax 10: BL2-RD: Ethernet Tag: Source: Group: VNI=6001.

The first border leaf network device may provide the first redundant multicast flow indication to the first service leaf network device, and the first service leaf network device may receive the first redundant multicast flow indication. The second border leaf network device may provide the second redundant multicast flow indication to the first service leaf network device, and the first service leaf network device may receive the second redundant multicast flow indication.

As further shown in FIG. 1A, and by reference number 104, the first service leaf network device may receive an IGMP report from the host. For example, the host may generate the IGMP report and may provide the IGMP report to the first service leaf network device. The IGMP report may be generated by the host whenever the host starts monitoring a multicast address. IGMP is a communications protocol used by the host to establish multicast group memberships. IGMP may enable the EVPN to direct multicast traffic only to a host that has requested the multicast traffic. The host may utilize IGMP to report multicast group memberships of the host to any immediately neighboring multicast network devices (e.g., the first service leaf network device).

As further shown in FIG. 1A, and by reference number 106, the first service leaf network device may broadcast a Type 6 selective multicast Ethernet tag (SMET) route based on receiving the IGMP report. For example, when the first service leaf network device receives the IGMP report from the host, the first service leaf network device may broadcast the Type 6 SMET route based on receiving the IGMP report. The Type 6 SMET route for a group (e.g., group G) may be imported by all EVPN devices (e.g., the first border leaf network device and the second border leaf network device may create state for group G). The Type 6 SMET route may enable the EVPN devices to selectively send or receive multicast traffic based on a presence or an absence of active receivers of the multicast traffic (e.g., a on a per group basis).

As shown in FIG. 1B, and by reference number 108, the first service leaf network device may identify the first redundant multicast flow indication and the second redundant multicast flow indication based on receiving the IGMP report. For example, when the first service leaf network device receives the IGMP report from the host, the first service leaf network device may determine, based on receiving the IGMP report, whether there are any redundant multicast flow indications (e.g., Type 10 S-PMSI route identifiers) associated with the group G. The first service leaf network device may determine, based on receiving the IGMP report, that the first redundant multicast flow indication and the second redundant multicast flow indication are associated with the group G.

As further shown in FIG. 1B, and by reference number 110, the first service leaf network device may designate a primary multicast flow based on the first redundant multicast flow indication and a backup multicast flow based on the second redundant multicast flow indication. For example, since the first redundant multicast flow indication is associated with the first border leaf network device, the first service leaf network device may designate the primary multicast flow as pointing to the first border leaf network device. In some implementations, the first service leaf network device may designate the primary multicast flow with a primary virtual tunnel end point (VTEP) or VNI (e.g., TLV-primary-path=BL1-SVTEP-IP or VNI=6000) pointing towards the first border leaf network device. Since the second redundant multicast flow indication is associated with the second border leaf network device, the first service leaf network device may designate the backup multicast flow as pointing to the second border leaf network device. In some implementations, the first service leaf network device may designate the backup multicast flow with a backup VTEP or VNI (e.g., TLV-backup-path=BL2-SVTEP-IP or VNI=6001) pointing towards the second border leaf network device.

As further shown in FIG. 1B, and by reference number 112, the first service leaf network device may accept the primary multicast flow. For example, the multicast source may generate the multicast traffic, and may provide the multicast traffic to the first border leaf network device and the second border leaf network device. The first border leaf network device may provide the multicast traffic to the first service leaf network device, via the primary multicast flow, and the first service leaf network device may receive the multicast traffic from the first border leaf network device. In some implementations, the first service leaf network device may forward the multicast traffic, received via the primary multicast flow, to the host.

In some implementations, the second border leaf network device may provide the multicast traffic to the first service leaf network device, via the backup multicast flow, and the first service leaf network device may receive the multicast traffic from the second border leaf network device. In such implementations, the first service leaf network device may not forward the multicast traffic, received via the backup multicast flow, to the host. Instead, the first service leaf network device may drop the multicast traffic received via the backup multicast flow.

As shown in FIG. 1C, and by reference number 114, the first service leaf network device may monitor a rate of the primary multicast flow. For example, the first service leaf network device may monitor the health (e.g., a rate of receipt) of the multicast traffic received from the primary multicast flow. The first service leaf network device may determine whether the rate of the multicast traffic received from the primary multicast flow satisfies a rate threshold. In some implementations, the first service leaf network device may determine that the rate of the primary multicast flow satisfies the rate threshold, and may continue to accept the primary multicast flow based on the rate of the primary multicast flow satisfying the rate threshold.

As further shown in FIG. 1C, and by reference number 116, the first service leaf network device may accept the backup multicast flow based on the rate of the primary multicast flow failing to satisfy the rate threshold. For example, the first service leaf network device may determine that the rate of the multicast traffic received from the primary multicast flow fails to satisfy the rate threshold, and may switch to receiving the multicast traffic from the backup multicast flow based on the rate of the multicast traffic failing to satisfy the rate threshold. In some implementations, when the multicast traffic received from the primary multicast flow fails to satisfy the rate threshold, the first service leaf network device may not forward the multicast traffic, received via the primary multicast flow, to the host. Instead, the first service leaf network device may drop the multicast traffic received via the primary multicast flow, and may forward the multicast traffic, received via the backup multicast flow, to the host.

Figure 1D:
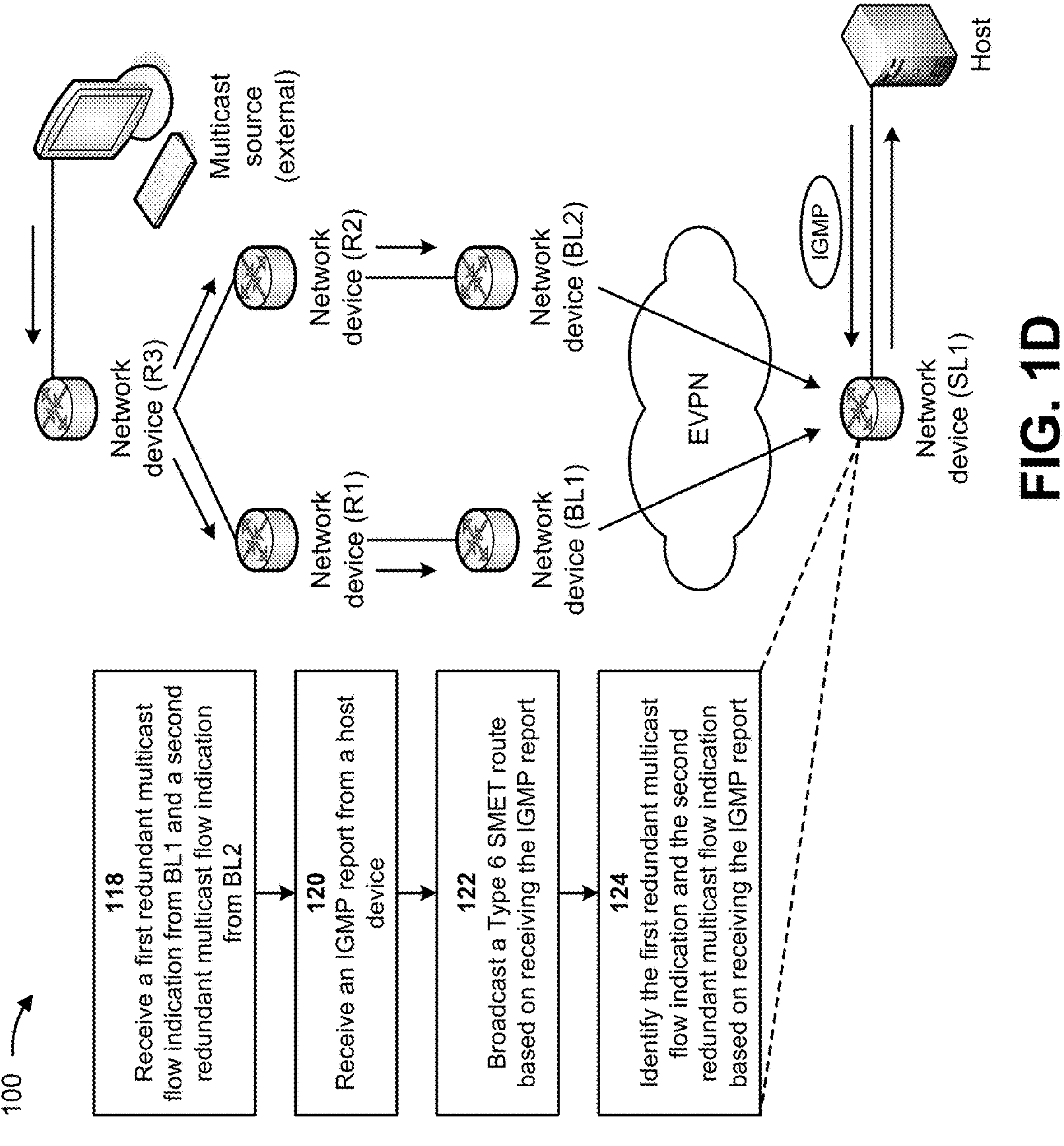
Figure 1E:
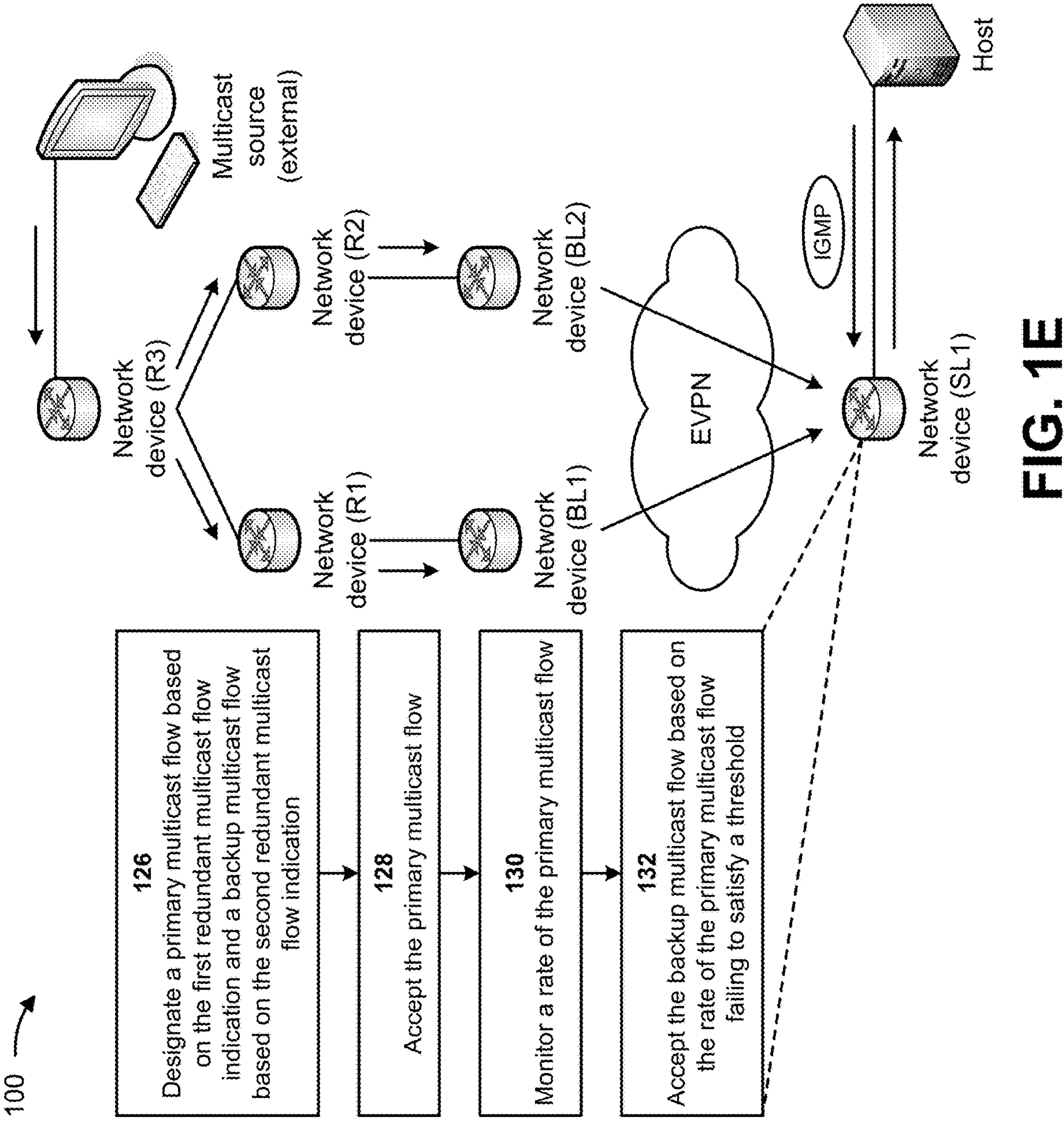

FIGS. 1D and 1E may depict a deployment with an external multicast source that is multihomed to a first border leaf network device (BL1) and a second border leaf network device (BL2). The first boarder leaf network device may connect to a first PIM gateway (R1), and the second border leaf network device may connect to a second PIM gateway (R2). The first PIM gateway and the second PIM gateway may connect to a third PIM gateway (R3) that is connected to the external multicast source. The first border leaf network device and the second border leaf network device may connect with a first service leaf network device (SL1) via the EVPN. The first service leaf network device may connect with a host.

As shown in FIG. 1D, and by reference number 118, the first service leaf network device may receive a first redundant multicast flow indication from the first border leaf network device (BL1) and a second redundant multicast flow indication from the second border leaf network device (BL2). For example, the first border leaf network device may originate the first redundant multicast flow indication, and the second border leaf network device may originate the second redundant multicast flow indication. In some implementations, each of the first redundant multicast flow indication and the second redundant multicast flow indication may include a Type 10 S-PMSI route identifier for an SFG (e.g., group G). In some implementations, the first redundant multicast flow indication may include the syntax 10: BL1-RD: Ethernet Tag: Source: Group: Originator-IP (BL1-SVTEP-IP): VNI, and the second redundant multicast flow indication may include the syntax 10: BL2-RD: Ethernet Tag: Source: Group: Originator-IP(BL2-SVTEP-IP): VNI. Alternatively, the first redundant multicast flow indication may include the syntax 10: BL1-RD: Ethernet Tag: Source: Group: VNI=6000, and the second redundant multicast flow indication may include the syntax 10: BL2-RD: Ethernet Tag: Source: Group: VNI=6001.

The first border leaf network device may provide the first redundant multicast flow indication to the first service leaf network device, and the first service leaf network device may receive the first redundant multicast flow indication. The second border leaf network device may provide the second redundant multicast flow indication to the first service leaf network device, and the first service leaf network device may receive the second redundant multicast flow indication.

As further shown in FIG. 1D, and by reference number 120, the first service leaf network device may receive an IGMP report from the host. For example, the host may generate the IGMP report and may provide the IGMP report to the first service leaf network device. The IGMP report may be generated by the host whenever the host starts monitoring a multicast address. The host may utilize IGMP to report multicast group memberships of the host to any immediately neighboring multicast network devices (e.g., the first service leaf network device).

As further shown in FIG. 1D, and by reference number 122, the first service leaf network device may broadcast a Type 6 SMET route based on receiving the IGMP report. For example, when the first service leaf network device receives the IGMP report from the host, the first service leaf network device may broadcast the Type 6 SMET route based on receiving the IGMP report. The Type 6 SMET route for a group (e.g., group G) may be imported by all EVPN devices (e.g., the first border leaf network device and the second border leaf network device may create state for group G).

As further shown in FIG. 1D, and by reference number 124, the first service leaf network device may identify the first redundant multicast flow indication and the second redundant multicast flow indication based on receiving the IGMP report. For example, when the first service leaf network device receives the IGMP report from the host, the first service leaf network device may determine, based on receiving the IGMP report, whether there are any redundant multicast flow indications (e.g., Type 10 S-PMSI route identifiers) associated with the group G. The first service leaf network device may determine, based on receiving the IGMP report, that the first redundant multicast flow indication and the second redundant multicast flow indication are associated with the group G.

As shown in FIG. 1E, and by reference number 126, the first service leaf network device may designate a primary multicast flow based on the first redundant multicast flow indication and a backup multicast flow based on the second redundant multicast flow indication. For example, since the first redundant multicast flow indication is associated with the first border leaf network device, the first service leaf network device may designate the primary multicast flow as pointing to the first border leaf network device. In some implementations, the first service leaf network device may designate the primary multicast flow with a primary VTEP or VNI (e.g., TLV-primary-path=BL1-SVTEP-IP or VNI=6000) pointing towards the first border leaf network device. Since the second redundant multicast flow indication is associated with the second border leaf network device, the first service leaf network device may designate the backup multicast flow as pointing to the second border leaf network device. In some implementations, the first service leaf network device may designate the backup multicast flow with a backup VTEP or VNI (e.g., TLV-backup-path=BL2-SVTEP-IP or VNI=6001) pointing towards the second border leaf network device.

As further shown in FIG. 1E, and by reference number 128, the first service leaf network device may accept the primary multicast flow. For example, the external multicast source may generate the multicast traffic, and may provide the multicast traffic to the third PIM gateway (R3). The third PIM gateway may provide the multicast traffic to the first PIM gateway (R1) and the second PIM gateway (R2). The first PIM gateway may provide the multicast traffic to the first border leaf network device and the second PIM gateway may provide the multicast traffic to the second border leaf network device. The first border leaf network device may provide the multicast traffic to the first service leaf network device, via the primary multicast flow, and the first service leaf network device may receive the multicast traffic from the first border leaf network device. In some implementations, the first service leaf network device may forward the multicast traffic, received via the primary multicast flow, to the host.

In some implementations, the second border leaf network device may provide the multicast traffic to the first service leaf network device, via the backup multicast flow, and the first service leaf network device may receive the multicast traffic from the second border leaf network device. In such implementations, the first service leaf network device may not forward the multicast traffic, received via the backup multicast flow, to the host. Instead, the first service leaf network device may drop the multicast traffic received via the backup multicast flow.

As further shown in FIG. 1E, and by reference number 130, the first service leaf network device may monitor a rate of the primary multicast flow. For example, the first service leaf network device may monitor the health (e.g., a rate of receipt) of the multicast traffic received from the primary multicast flow. The first service leaf network device may determine whether the rate of the multicast traffic received from the primary multicast flow satisfies a rate threshold. In some implementations, the first service leaf network device may determine that the rate of the primary multicast flow satisfies the rate threshold, and may continue to accept the primary multicast flow based on the rate of the primary multicast flow satisfying the rate threshold.

As further shown in FIG. 1E, and by reference number 132, the first service leaf network device may accept the backup multicast flow based on the rate of the primary multicast flow failing to satisfy the rate threshold. For example, the first service leaf network device may determine that the rate of the multicast traffic received from the primary multicast flow fails to satisfy the rate threshold, and may switch to receiving the multicast traffic from the backup multicast flow based on the rate of the multicast traffic failing to satisfy the rate threshold. In some implementations, when the multicast traffic received from the primary multicast flow fails to satisfy the rate threshold, the first service leaf network device may not forward the multicast traffic, received via the primary multicast flow, to the host. Instead, the first service leaf network device may drop the multicast traffic received via the primary multicast flow, and may forward the multicast traffic, received via the backup multicast flow, to the host.

Figure 1F:
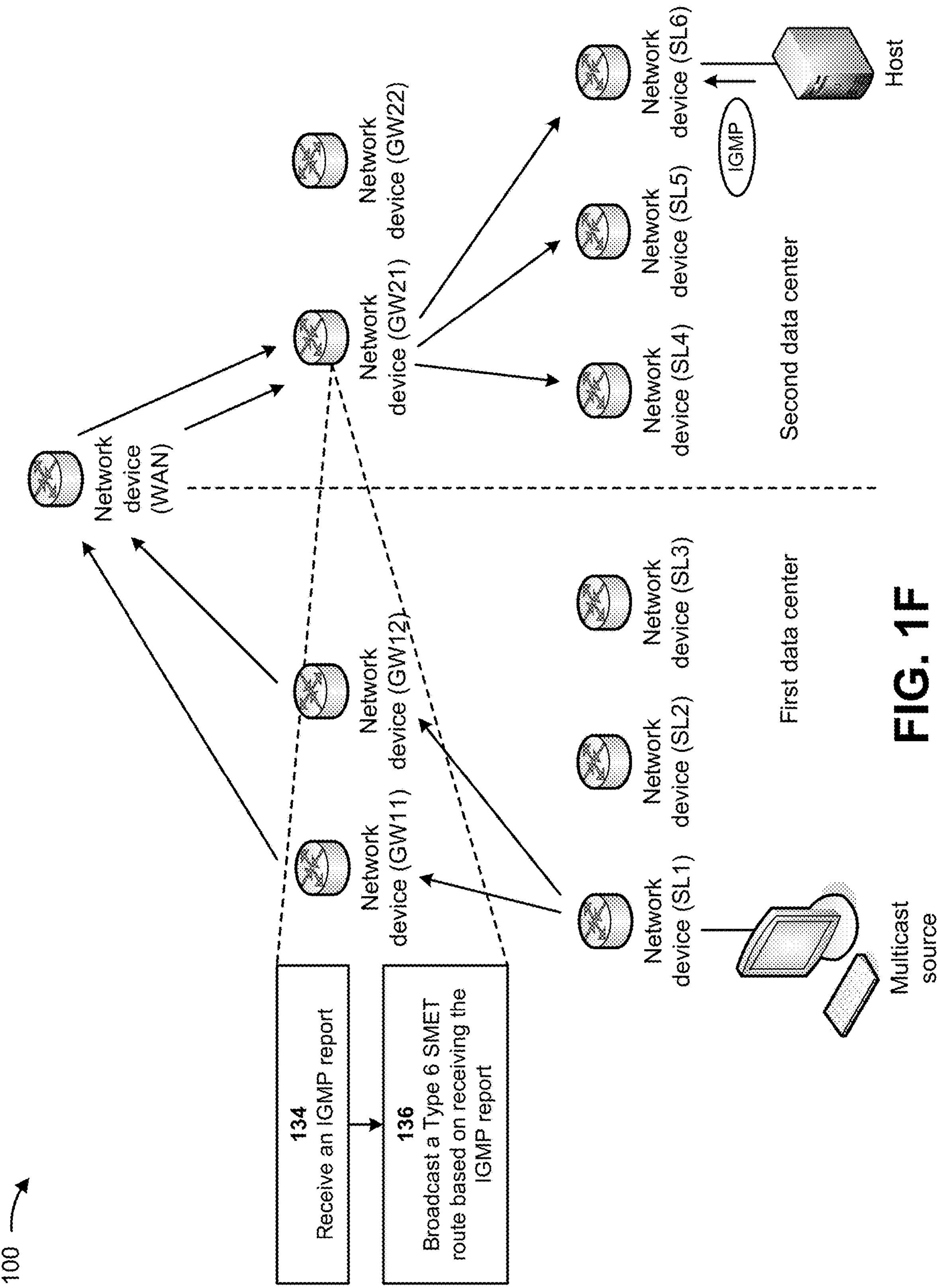
Figure 1G:
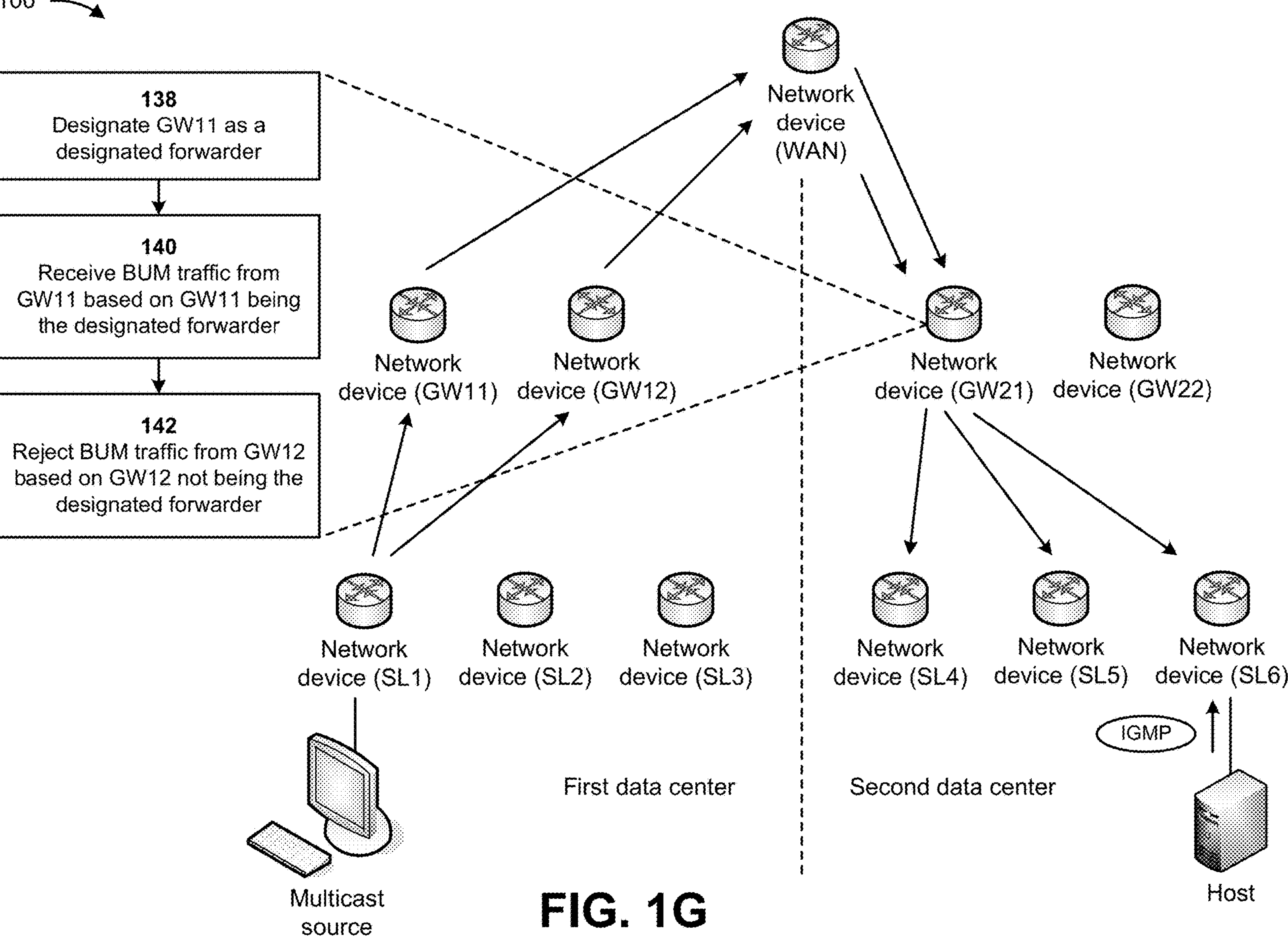
Figure 1H:
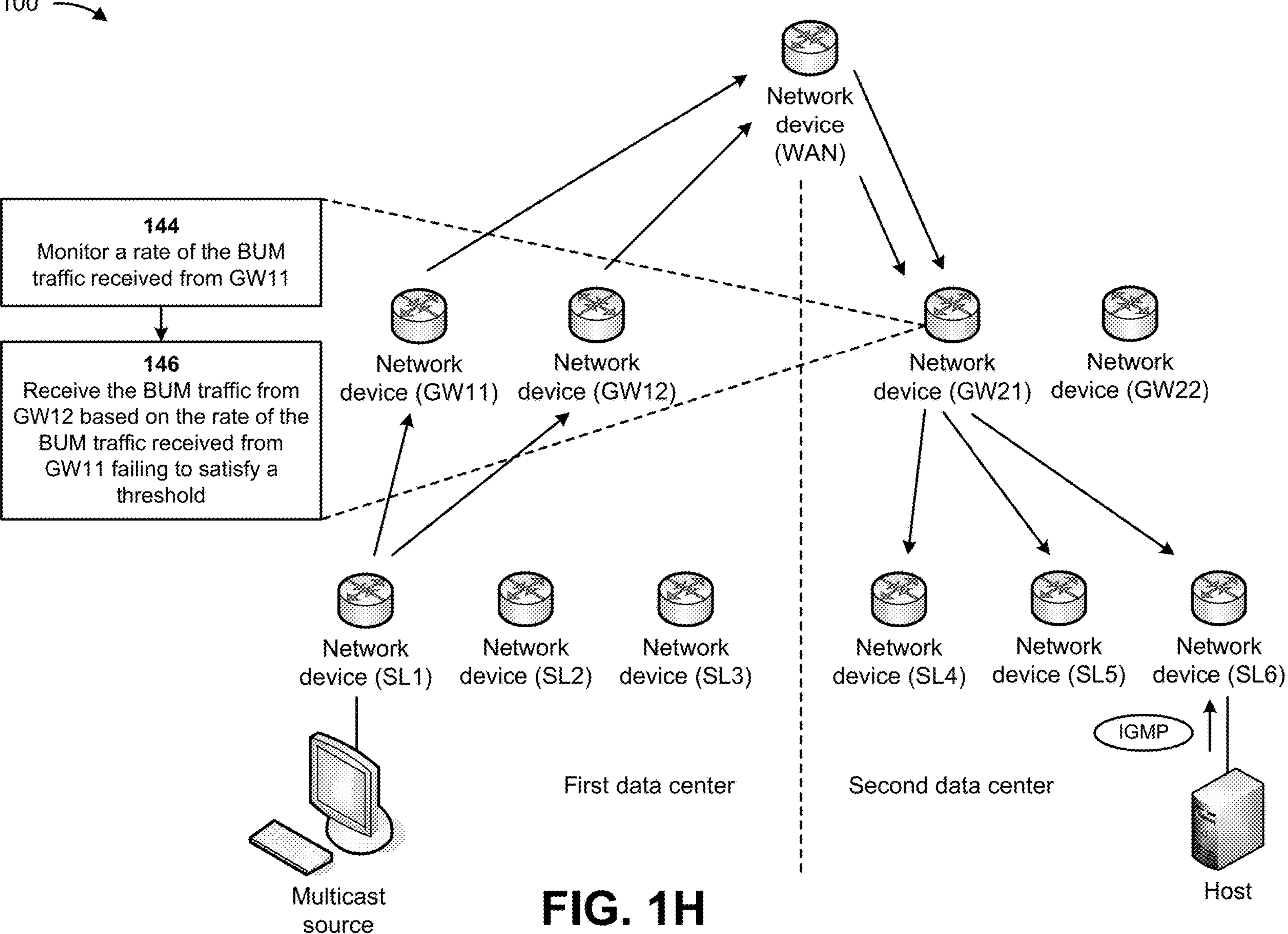

FIGS. 1F-1H may depict an EVPN-data center interconnect (DCI) deployment. As shown, a first data center may include a multicast source connected to a first service leaf network device (SL1), a second service leaf network device (SL2), and a third service leaf network device (SL3). The first service leaf network device may connect with a first gateway (GW11) and a second gateway (GW12). A wide area network (WAN) device may connect the first data center to a second data center that includes a third gateway (GW21) and a fourth gateway (GW22). The third gateway and a host may connect with a fourth service leaf network device (SL4), a fifth service leaf network device (SL5), and a sixth service leaf network device (SL6).

As shown in FIG. 1F, and by reference number 134, the third gateway may receive an IGMP report from the host. For example, the host may generate the IGMP report and may provide the IGMP report to the sixth service leaf network device. The sixth service leaf network device may provide the IGMP report to the third gateway. The IGMP report may be generated by the host whenever the host starts monitoring a multicast address. The host may utilize IGMP to report multicast group memberships of the host to any immediately neighboring multicast network devices (e.g., the first service leaf network device).

As further shown in FIG. 1F, and by reference number 136, the third gateway may broadcast a Type 6 SMET route based on receiving the IGMP report. For example, when the third gateway receives the IGMP report from the host, the third gateway may broadcast the Type 6 SMET route based on receiving the IGMP report. The Type 6 SMET route for a group (e.g., group G) may be imported by all devices associated with the first data center and/or the second data center (e.g., the first gateway and the second gateway may create state for group G).

As shown in FIG. 1G, and by reference number 140, the third gateway may designate the first gateway (GW11) as a designated forwarder of the first data center. In some implementations, the third gateway may designate the first gateway (GW11) as a designated forwarder of the first data center with a primary VTEP or VNI (e.g., TLV-primary-path=GW1 SVTEP-IP or VNI=6000) pointing towards the first gateway. Since the second gateway (GW12) is not the designated forwarder of the first data center, the third gateway may reject broadcast, unknown-unicast, and multicast (BUM) traffic from the second gateway. In some implementations, the third gateway may designate the second gateway as not the designated forwarder of the first data center with a backup VTEP or VNI (e.g., TLV-backup-path=GW12-SVTEP-IP or VNI=6001) pointing towards the second gateway. In some implementations, the third gateway may have a forwarding state (e.g., (*,g)) such that traffic from the second gateway is rejected (but otherwise accepted). For such as forwarding state, the third gateway may accept traffic from anywhere except from known non-designated forwarders of the first data center.

As further shown in FIG. 1G, and by reference number 140, the third gateway may receive BUM traffic from the first gateway (GW11) based on the first gateway being the designated forwarder of the first data center. For example, the multicast source may generate BUM traffic, and may provide the BUM traffic to the first service leaf network device (SL1). The first service leaf network device may provide the BUM traffic to the first gateway and the second gateway. The first gateway may provide the BUM traffic to the WAN device, via the primary multicast flow, and the third gateway may receive the BUM traffic from the WAN device. In some implementations, the third gateway may forward the BUM traffic to the host.

As further shown in FIG. 1G, and by reference number 142, the third gateway may reject BUM traffic from the second gateway (GW12) based on the second gateway not being the designated forwarder of the first data center. In some implementations, the second gateway may provide the BUM traffic to the WAN device, and the third gateway may receive the BUM traffic from the WAN device. In such implementations, the third gateway may not forward the BUM traffic, received via the second gateway, to the host. Instead, the third gateway may reject the BUM traffic received via the second gateway.

As shown in FIG. 1H, and by reference number 144, the third gateway may monitor a rate of the BUM traffic received from the first gateway (GW11). For example, the third gateway may monitor the health (e.g., a rate of receipt) of the BUM traffic received from the first gateway. The third gateway may determine whether the rate of the BUM traffic received from the first gateway satisfies a rate threshold. In some implementations, the third gateway may determine that the rate of the first gateway satisfies the rate threshold, and may continue to receive the BUM traffic from the first gateway based on the rate of the BUM traffic received from the first gateway satisfying the rate threshold.

As further shown in FIG. 1H, and by reference number 146, the third gateway may receive the BUM traffic from the second gateway (GW12) based on the rate of the BUM traffic received from the first gateway failing to satisfy the rate threshold. For example, the third gateway may determine that the rate of the BUM traffic received from the first gateway fails to satisfy the rate threshold, and may switch to receiving the BUM traffic from the second gateway based on the rate of the BUM traffic received from the first gateway failing to satisfy the rate threshold. In some implementations, when the BUM traffic received from the first gateway fails to satisfy the rate threshold, the third gateway may not forward the BUM traffic, received from the first gateway, to the host. Instead, the third gateway may reject the BUM traffic received from the first gateway, and may forward the BUM traffic, received via the second gateway, to the host.

In this way, the network device provides enhanced RPF for redundant EVPN-VXLAN deployments. For example, the network device (e.g., a service leaf network device) may utilize two approaches to distinguish primary and backup multicast streams for a layer 2 group multicast flow. In a first approach, the network device may utilize VTEP addresses to distinguish between the primary and backup multicast streams for a layer 2 group multicast flow. In a second approach, the network device may utilize a primary VNI and a backup VNI to distinguish between the primary and backup multicast streams for a layer 2 group multicast flow. The network device may receive two copies of multicast traffic (e.g., a first copy from the first border leaf network device and a second copy from the second border leaf network device). The network device may select one copy of the multicast traffic, may forward selected copy to the host, and may drop the other copy. For example, the network device may select the multicast traffic received from the first border leaf network device and may drop the multicast traffic received from the second border leaf network device. The network device may monitor a rate of the multicast traffic received from the first border leaf network device. If the rate fails to satisfy a threshold, the network device may switch to receiving the multicast traffic from the second border leaf network device. Thus, the network device conserves computing resources, networking resources, and/or the like that would otherwise have been consumed by delaying multicast traffic transmission through a network due to a link failure, a network device failure, and/or path congestion, losing multicast traffic due to the link failure, the network device failure, and/or the path congestion, handling lost multicast traffic caused by the link failure, the network device failure, and/or the path congestion, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
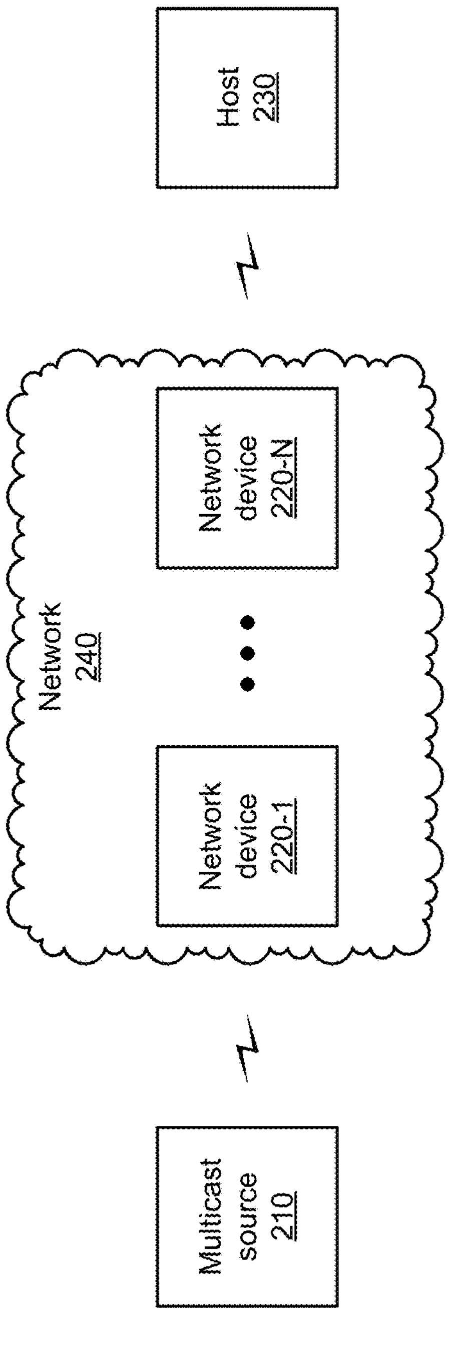
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an multicast source 210, a group of network devices 220 (shown as network device 220-1 through network device 220-N), a host 230, and a network 240. Devices of the environment 200 may interconnect via wired connections, wireless connections, or a combination of wired and wireless connections.

The multicast source 210 includes one or more devices capable of receiving, generating, storing, processing, and/or providing information, such as information described herein. For example, the multicast source 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device, associated with multicast traffic. In some implementations, the multicast source 210 may receive network traffic from and/or may provide network traffic to other multicast sources 210 and/or the host 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The host 230 includes one or more devices capable of receiving, generating, storing, processing, and/or providing information, such as information described herein. For example, the host 230 may include a laptop computer, a tablet computer, a desktop computer, a server device, a group of server devices, or a similar type of device, associated with multicast traffic. In some implementations, the host 230 may receive information from and/or transmit information (e.g., multicast traffic) to the multicast source 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
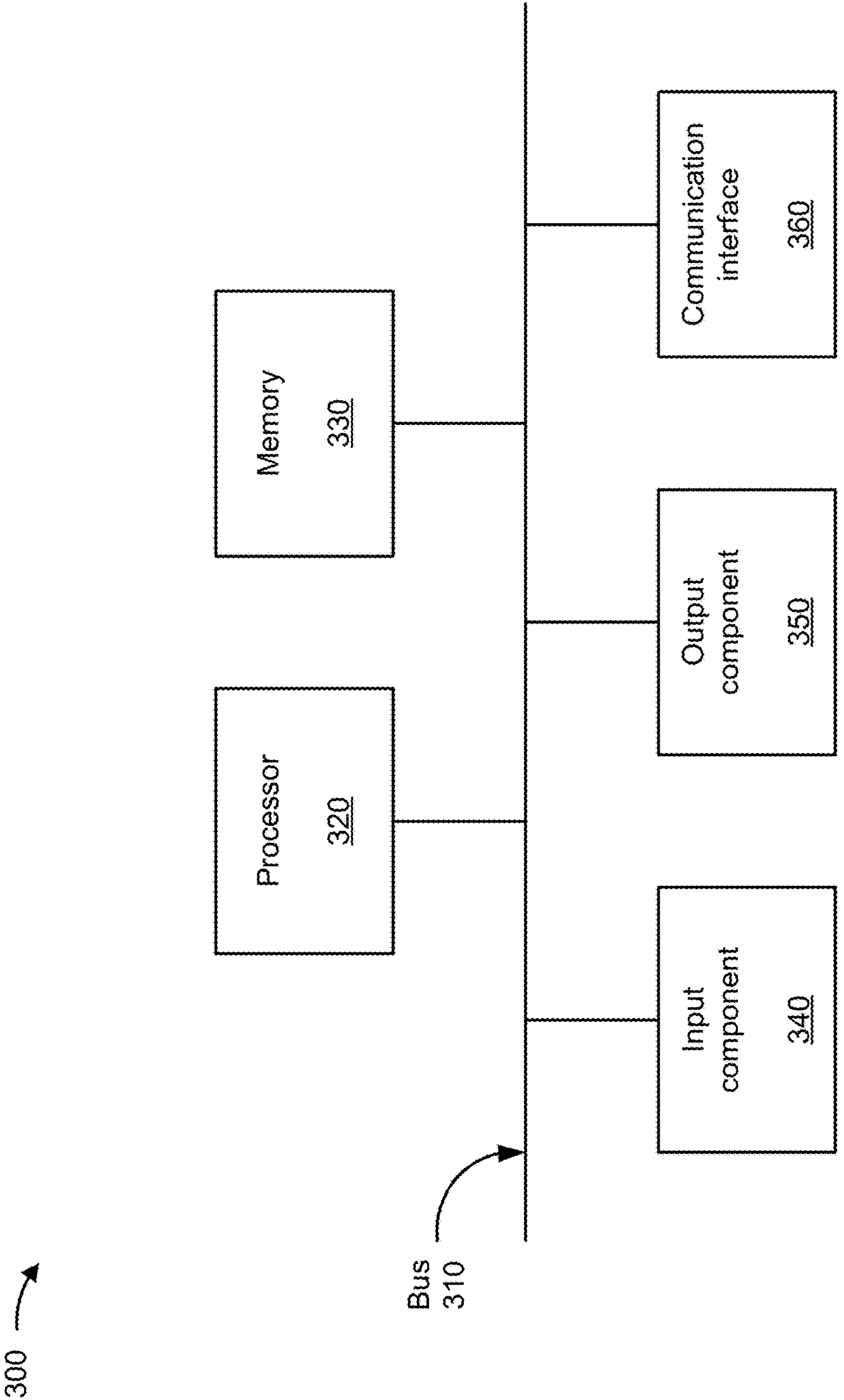
FIGS. 3 and 4 are diagrams of example components of one or more devices of FIG. 2.

FIG. 3 is a diagram of example components of one or more devices of FIG. 2. The example components may be included in a device 300, which may correspond to the multicast source 210, the network device 220, and/or the host 230. In some implementations, the multicast source 210, the network device 220, and/or the host 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
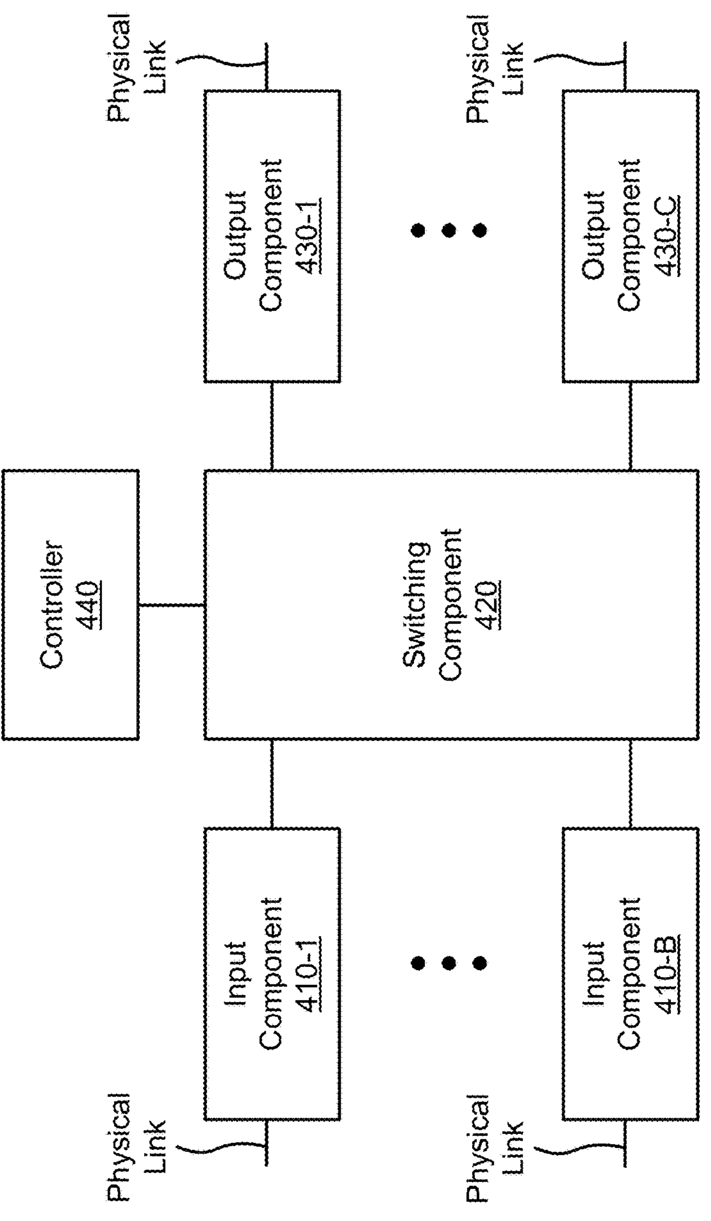

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
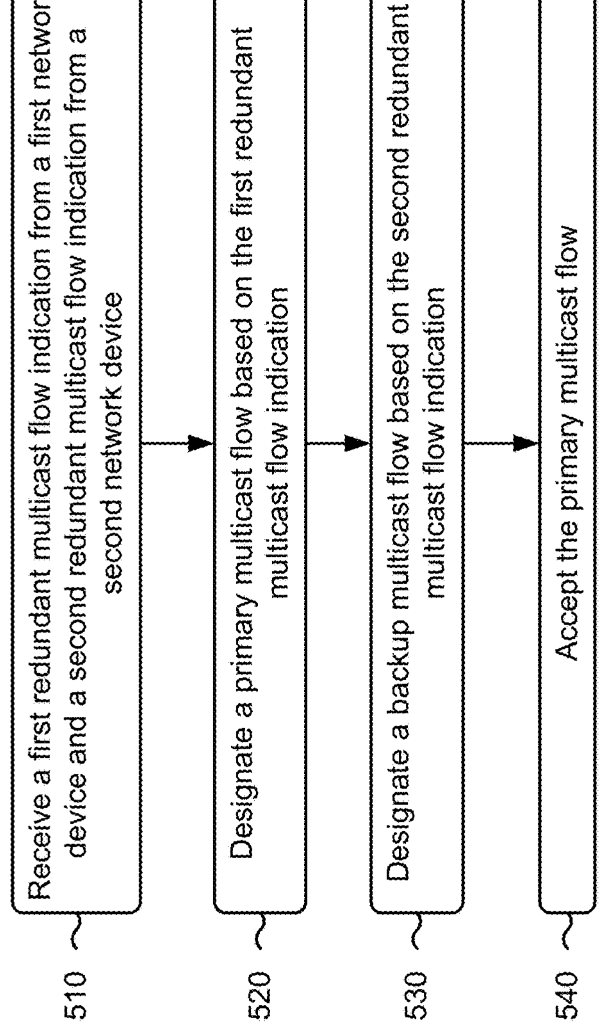
FIG. 5 is a flowchart of an example process for providing enhanced RPF for redundant EVPN-VXLAN deployments.

FIG. 5 is a flowchart of an example process 500 for providing enhanced RPF for redundant EVPN-VXLAN deployments. In some implementations, one or more process blocks of FIG. 5 may be performed by a network device (e.g., the network device 220). In some implementations, one or more process blocks of FIG. 5 may be performed by another device or a group of devices separate from or including the network device, such as a multicast source (e.g., the multicast source 210) and/or a host (e.g., the host 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving a first redundant multicast flow indication from a first network device and a second redundant multicast flow indication from a second network device (block 510). For example, the network device may receive a first redundant multicast flow indication from a first network device and a second redundant multicast flow indication from a second network device, as described above. In some implementations, the network device is a service leaf network device or a data center interconnect gateway. In some implementations, each of the first redundant multicast flow indication and the second redundant multicast flow indication is a Type 10 selective-provider multicast service interface route identifier. In some implementations, the first redundant multicast flow indication includes a first virtual extensible local area network (VXLAN) network identifier (VNI) or a first source VXLAN tunnel endpoint (VTEP) identifier and the second redundant multicast flow indication includes a second VNI or a second source VTEP identifier.

In some implementations, the first network device and the second network device are gateways provided in a first data center and the network device is a gateway provided in a second data center separate from the first data center. In some implementations, the first network device and the second network device communicate with the network device via an Ethernet virtual private network.

In some implementations, receiving the first redundant multicast flow indication from the first network device and the second redundant multicast flow indication from the second network device includes receiving the first redundant multicast flow indication from a first advertisement generated by the first network device, and receiving the second redundant multicast flow indication from a second advertisement generated by the second network device.

As further shown in FIG. 5, process 500 may include designating a primary multicast flow based on the first redundant multicast flow indication (block 520). For example, the network device may designate a primary multicast flow based on the first redundant multicast flow indication, as described above.

As further shown in FIG. 5, process 500 may include designating a backup multicast flow based on the second redundant multicast flow indication (block 530). For example, the network device may designate a backup multicast flow based on the second redundant multicast flow indication, as described above. In some implementations, the first network device is connected to a source of the primary multicast flow via a first protocol independent multicast (PIM) gateway and the second network device is connected to the source of the backup multicast flow via a second PIM gateway.

As further shown in FIG. 5, process 500 may include accepting the primary multicast flow (block 540). For example, the network device may accept the primary multicast flow, as described above. In some implementations, accepting the primary multicast flow includes accepting multicast traffic with an outer source address that matches an address of the first network device generating the primary multicast flow.

In some implementations, process 500 includes receiving a report from a host device, and identifying the first redundant multicast flow indication and the second redundant multicast flow indication based on receiving the report. In some implementations, process 500 includes monitoring a rate of the primary multicast flow, and continuing to accept the primary multicast flow based on the rate of the primary multicast flow satisfying a rate threshold. In some implementations, process 500 includes accepting the backup multicast flow based on the rate of the primary multicast flow failing to satisfy the rate threshold. In some implementations, accepting the backup multicast flow includes accepting multicast traffic with an outer source address that matches an address of the second network device generating the backup multicast flow.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a network device, a first redundant multicast flow indication from a first network device and a second redundant multicast flow indication from a second network device, wherein the first redundant multicast flow indication includes a first virtual extensible local area network (VXLAN) network identifier (VNI) or a first source VXLAN tunnel endpoint (VTEP) identifier and the second redundant multicast flow indication includes a second VNI or a second source VTEP identifier, and wherein one or more of the first redundant multicast flow indication and the second redundant multicast flow indication is a Type 10 selective-provider multicast service interface route identifier;

designating, by the network device, a primary multicast flow based on the first redundant multicast flow indication;

designating, by the network device, a backup multicast flow based on the second redundant multicast flow indication;

accepting, by the network device, the primary multicast flow; and monitoring, by the network device, a rate of the primary multicast flow.

2. The method of claim 1, further comprising: receiving a report from a host device; and identifying the first redundant multicast flow indication and the second redundant multicast flow indication based on receiving the report.

3. The method of claim 1, further comprising: continuing to accept the primary multicast flow based on the rate of the primary multicast flow satisfying a rate threshold.

4. The method of claim 3, further comprising: accepting the backup multicast flow based on the rate of the primary multicast flow failing to satisfy the rate threshold.

5. The method of claim 4, wherein accepting the backup multicast flow comprises:

accepting multicast traffic with an outer source address that matches an address of the second network device forwarding the backup multicast flow.

6. The method of claim 1, wherein accepting the primary multicast flow comprises:

accepting multicast traffic with an outer source address that matches an address of the first network device forwarding the primary multicast flow.

7. The method of claim 1, wherein the network device is a service leaf network device or a data center interconnect gateway.

8. A network device, comprising:

one or more memories; and one or more processors to:

receive a first redundant multicast flow indication from a first network device and a second redundant multicast flow indication from a second network device, wherein the first redundant multicast flow indication includes a first virtual extensible local area network (VXLAN) network identifier (VNI) or a first source VXLAN tunnel endpoint (VTEP) identifier and the second redundant multicast flow indication includes a second VNI or a second source VTEP identifier, and wherein one or more of the first redundant multicast flow indication and the second redundant multicast flow indication is a Type 10 selective-provider multicast service interface (S-PMSI) route identifier;

designate a primary multicast flow based on the first redundant multicast flow indication;

designate a backup multicast flow based on the second redundant multicast flow indication;

accept the primary multicast flow; and monitor a rate of the primary multicast flow.

9. The network device of claim 8, wherein the first network device is connected to a source of the primary multicast flow via a first protocol independent multicast (PIM) gateway and the second network device is connected to the source of the backup multicast flow via a second PIM gateway.

10. The network device of claim 8, wherein the first network device and the second network device communicate with the network device via an Ethernet virtual private network.

11. The network device of claim 8, wherein the one or more processors, to receive the first redundant multicast flow indication from the first network device and the second redundant multicast flow indication from the second network device, are to:

receive the first redundant multicast flow indication from a first advertisement generated by the first network device; and receive the second redundant multicast flow indication from a second advertisement generated by the second network device.

12. The network device of claim 8, wherein the one or more processors, are further to:

broadcast a Type 6 selective multicast Ethernet tag (SMET) route based on receiving an Internet group management protocol (IGMP) report; and wherein the one or more processors, to receive the first redundant multicast flow indication from the first network device and the second redundant multicast flow indication from a second network device, are to:

identify the first redundant multicast flow indication and the second redundant multicast flow indication based on receiving the IGMP report.

13. The network device of claim 8, wherein the one or more processors are further to:

accept the backup multicast flow based on the rate of the primary multicast flow failing to satisfy a rate threshold.

14. A non-transitory computer-readable medium storing a set of instructions, the set of instructions comprising:

one or more instructions that, when executed by one or more processors of a network device, cause the network device to:

receive a first redundant multicast flow indication from a first network device and a second redundant multicast flow indication from a second network device, wherein the first redundant multicast flow indication includes a first virtual extensible local area network (VXLAN) network identifier (VNI) or a first source VXLAN tunnel endpoint (VTEP) identifier and the second redundant multicast flow indication includes a second VNI or a second source VTEP identifier, and wherein one or more of the first redundant multicast flow indication and the second redundant multicast flow indication is a Type 10 selective-provider multicast service interface route identifier;

designate a primary multicast flow based on the first redundant multicast flow indication;

designate a backup multicast flow based on the second redundant multicast flow indication;

accept the primary multicast flow; and monitor a rate of the primary multicast flow.

15. The non-transitory computer-readable medium of claim 14, wherein the one or more instructions further cause the network device to:

receive a report from a host device; and identify the first redundant multicast flow indication and the second redundant multicast flow indication based on receiving the report.

16. The non-transitory computer-readable medium of claim 14, wherein the one or more instructions further cause the network device to:

continue to accept the primary multicast flow based on the rate of the primary multicast flow satisfying a rate threshold.

17. The non-transitory computer-readable medium of claim 16, wherein the one or more instructions further cause the network device to:

accept the backup multicast flow based on the rate of the primary multicast flow failing to satisfy the rate threshold.

18. The non-transitory computer-readable medium of claim 14, wherein the network device is a service leaf network device or a data center interconnect gateway.

19. The non-transitory computer-readable medium of claim 14, wherein the one or more instructions, to accept the backup multicast flow, causes the network device to:

accept multicast traffic with an outer source address that matches an address of the second network device forwarding the backup multicast flow.

20. The non-transitory computer-readable medium of claim 14, wherein the one or more instructions, to accept the backup multicast flow, causes the network device to:

accept multicast traffic with an outer source address that matches an address of the first network device forwarding the primary multicast flow.

* * * * *